May 6, 1969 R. M. VOITIK 3,442,516
SEAL FOR OSCILLATING SHAFTS
Filed Sept. 29, 1966
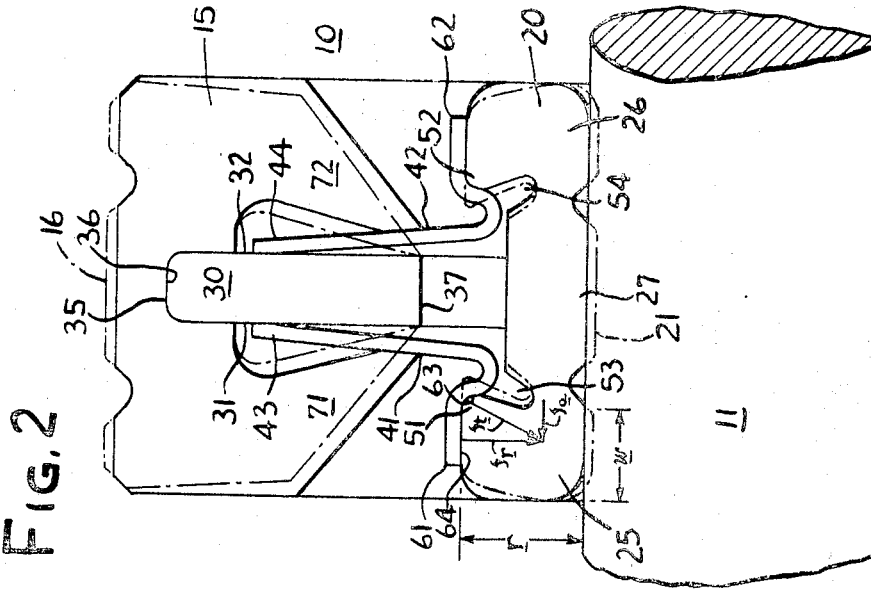
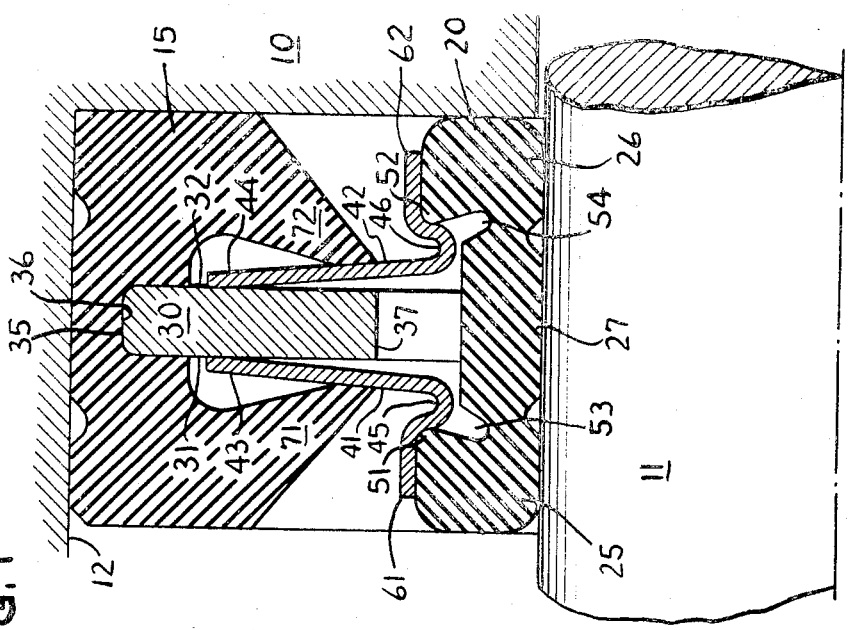
INVENTOR
ROBERT M. VOITIK
by: Wolfe, Hubbard, Voit & Osann
ATTYS.

ated May 6, 1969

United States Patent Office 3,442,516
Patented May 6, 1969

3,442,516
SEAL FOR OSCILLATING SHAFTS
Robert M. Voitik, Glenview, Ill., assignor to Continental Illinois National Bank and Trust Company of Chicago as trustee under the Cartridge Type Seal Liquidation Trust No. 54870
Filed Sept. 29, 1966, Ser. No. 582,874
Int. Cl. F16j 15/40, 9/00; F16k 41/00
U.S. Cl. 277—39
3 Claims

ABSTRACT OF THE DISCLOSURE

A seal particularly suited to the sealing of oscillating shafts characterized by an annular rubber grommet and an annular rubber boot, the latter mounting a sealing ring, and with the grommet carrying a pair of diaphragm rings which bear on opposite sides of the sealing ring. The grommet is stressed to press the diaphragm rings mutually inwardly against the sealing ring.

---

The present invention relates to shaft seals and more particularly to a seal construction which is well suited to the sealing of an oscillating shaft.

It is an object of the present invention to provide a seal for an oscillating shaft which is inherently long-lived, being capable of reliable operation over many millions of reversing cycles. It is another object of the invention to provide a shaft seal for use under conditions requiring near absolute reliability such as in military equipment. It is a further object to provide a shaft seal which is intended particularly for exclusion of foreign matter such as mud and water and in which such foreign matter is prevented from reaching the internal sealing surfaces.

It is another important object of the present invention to provide a seal which is capable of operating efficiently in spite of a large amount of eccentricity or "runout" of the shaft with respect to its clearance opening.

In one of the aspects of the present invention it is an object to provide a shaft seal in which the resilient properties of rubber are employed to provide the biasing forces and in which the rubber is simultaneously deformed and confined to permit achieving of relatively high forces per unit volume of the stressed material.

In another aspect of the present invention it is an object to provide a seal construction in which the sealing forces are internally generated and self-cancelling and which the sealing action is equally effective in both directions.

Then too, it is an object to provide a seal which is simple and economical to manufacture and assemble.

Other objects and advantages of the invention will become apparent upon reading the attached detailed description and upon reference to the drawings in which:

FIGURE 1 is an enlarged cross section of a seal assembly constructed in accordance with the present invention;

FIG. 2 is a diagram showing the elements of FIG. 1 but with the profiles of the boot and grommet in the unstressed state indicated by the dotted outline.

While the invention has been described herein in connection with a preferred embodiment, it will be understood that I do not intend to be limited to the particular embodiment but intend, on the contrary, to cover the various alternative and equivalent constructions included within the spirit and scope of the appended claims.

Referring now to FIG. 1 there is shown a seal assembly 10 interposed between a shaft 11 and a circular opening 12. The opening 12 may be any opening in an equipment housing, for example, an opening in the wall of a piece of military equipment which must remain sealed against entry of foreign material under difficult field conditions. Fitted in the opening 12 is an annular rubber boot 15 having an outer surface 16 (see FIG. 2) which is somewhat oversized to insure a snug fit. Mounted on the shaft in opposed relation to the boot is an annular rubber grommet 20 having an inner surface 21 providing an interfering fit with respect to the shaft and having enlarged shoulder portions 25, 26 at its ends joined by a resilient center portion 27.

Mounted within the boot 15 is an annular sealing ring 30 presenting flat sealing surfaces 31, 32 on its opposite sides. The outer edge 35 of the sealing ring is tightly fitted into a groove 36 integrally formed in the center of the boot. The inner edge of the sealing ring, indicated at 37, is dimensioned to "clear" the center portion 27 of the grommet to define a relatively large radial clearance space.

Arranged on opposite sides of the sealing ring are annular diaphragm rings 41, 42 having lip portions 43, 44 which ride on the opposite faces of the sealing ring and base portions 45, 46 which extend continuously around the grommet 20.

In carrying out the present invention the base portions of the diaphragm rings are anchored in the respective ends of the grommet and the grommet is dimensioned to be in tension when the device is assembled so that the forces exerted by the grommet upon the diaphragm rings are directed mutually inward to insure that the lip portions of the diaphragm rings are kept in snug sealing engagement with respect to the sealing ring, regardless of whether the seal is at rest or undergoing the relative oscillatory movement for which it is intended. More specifically in accordance with the invention the end or shoulder portions of the grommet are of enlarged "squarish" cross section presenting shoulders which face mutually inward, and the base portions of the diaphragm rings are formed with integral flanges which conform to the shoulders on the grommet and which have surfaces providing both axial and radial engagement with the shoulders so that the shoulder portions of the grommet are both deformed and confined for efficient production of biasing stress. Thus, referring to the drawings, the enlarged shoulder surfaces 25, 26 of the grommet will be seen to be of "squarish" cross section having a radial dimension $r$ and an axial dimension $w$ providing upraised shoulders 51, 52 which face mutually inward and which have adjacent grooves 53, 54. The annular base portions 45, 46 of the diaphragm rings have flanges 61, 62 which engage the shoulders 51, 52 of the grommet. Taking the flange 61 by way of example it will be noted that it has both an axially facing surface 63 and a radially facing surface 64. The shoulder 51, in pressing against the axially facing surface 63, urges the diaphragm ring against the sealing ring to establish firm contact and positive sealing. At the same time, the radially facing surface 64 on the flange 61 confines the rubber in the shoulder 25 of the grommet, placing it under radial compression, so that a shearing stress, parallel to the axis, is developed in the shoulder portion of the grommet producing a spring rate which is higher than if the grommet were left radially unconfined. It will be apparent to one skilled in the art that the shear stresses which are set up in the end portions of the grommet result in axial components of force which are equal and opposite and which tend to place the central portion 27 of the grommet under tension loading. Such tension loading is entirely internal and balanced, so that no additional means need be provided for absorbing the endwise reaction force. Thus the grommet 20 tends to remain stably on the shaft in a position which is centered with respect to the engaged sealing ring 30.

For the purpose of visualizing the forces at work in the grommet, the force vector $f_t$ may be considered to represent the net force applied by the flange 61 to the shoulder 51. Such force has two components, a radial component of compression indicated at $f_r$ and an axial component at $f_a$. The force $f_a$ which produces the shear stress in the portion 25 also produces tension in the central portion 27 which is balanced out by the equal and opposite tension-producing component which is generated in the shoulder portion 26 at the other end of the grommet.

The distance between the shoulders 51, 52 of the grommet, when the grommet is in the unstressed state, is, as indicated by the dotted outlines, less than the spacing between the radially facing surfaces on the flanges. Thus in assembling the device the grommet must be stretched or preloaded. This tends to cock the shoulder portions 25, 26 of the seal inwardly. However when the assembly is pressed onto the shaft such shoulder portions are rocked outwardly in the direction of the flanges which they engage, thus "stiffening" the grommet and substantially increasing the internally developed tension and, hence, the forces which are effective at the engaged sealing surfaces.

The diaphragm rings are preferably formed of thin resilient, i.e., springy, material so that the rings are brought into sealing engagement to an equal degree about their entire periphery in spite of minor dimensional imperfections. Preferably also, the diaphragm rings are of a shallow, dished shape but with the lip portion 43, 44 presenting annular faces which are parallel to the opposite faces of the sealing ring 30. This not only provides a substantial area in rotative contact, which distributes the wear and which avoids grooving of the sealing ring, but also permits relative radial movement to occur between the diaphragm rings and the sealing rings while maintaining the integrity of the seal. Consequently the present design of seal is capable of tolerating large amounts of eccentricity and "runout." By eccentricity is meant a condition of nonconcentricity of the shaft and the opening through which it passes. The term "runout" refers to a condition in which the center of rotation is not concentric with the shaft surface causing "wobble" of the shaft with respect to the opening through which it passes.

In accordance with one of the aspects of the present invention, the boot 15, in addition to providing a snug mounting for the sealing ring 30, is provided with integral lip portions 71, 72 which overlie the lip portions of the diaphragm rings and resiliently engage the presented outer surfaces of the diaphragm rings. The lips, in the unstressed state, occupy the position indicated by the dotted outline (FIG. 2), with the deformtion into working position insuring protective contact around the entire periphery of the diaphragm rings. The boot lips thus perform a preliminary protective function, preventing entry of foreign material into the inner space housing the joints between the diaphragm rings and sealing ring. The space between the diaphragm rings is preferably packed with grease. Thus, in operation, the boot and sealing ring 30 remains stationary while the diaphragm rings revolve, with eccentricity being immaterial and with "runout" being readily accommodated by sliding movement of the diaphragm rings with respect to the presented surfaces of the sealing ring. Because of the plentiful supply of lubricant and the tendency of the lubricant to work its way between the engaged surfaces, a wide variety of materials may be employed for the diaphragm rings and sealing rings. Using thin phosphor bronze for the diaphragm rings, the sealing ring may be made of metal, carbon or other suitable substance.

Although the invention has been described above in connection with a preferred embodiment, one skilled in the art will understand that certain modifications and simplifications are possible without departing from the invention. For example, it will be understood that while the boot 15 is fitted into the opening and the grommet 20 encircles the shaft, the structure may be inverted without any change in cross section or function. That is to say, the surface 12 shown in the drawing may be considered to be the surface of the shaft and the surface 11 may be considered to be the inner surface of the opening surrounding the shaft. Moreover, while a symmetrical arrangement is disclosed employing two diaphragm rings and with the axial forces on the shoulder portions 25, 26 cancelling one another, one of the diaphragm rings may, in a simplified version, be omitted while still preserving certain features and advantages of the construction.

Moreover it will be understood that while the boot and grommet have been referred to as made of rubber, it will be understood that the latter term is intended to be generic to synthetic or substitute substances having the same characteristic as rubber. The terms "enlarged" and "squarish" have been applied to the shoulder portion 25, 26 of the grommet. In this connection it will be understood that these terms denote an annular rim or enlargement which is sufficiently large in both the radial and axial dimensions, with respect to the adjacent groove or cross section of adjacent material, so that appreciable reaction forces may be developed, particularly where the shoulder portion is confined both radially and axially by the flange of the cooperating diaphragm ring.

It is found that the above described structure provides a long reliable life even under the most difficult conditions which may be encountered by military apparatus in the field. The assembly is inherently inexpensive and does not require manufacture to high tolerances. Assembly is simple, and, once assembled, the seal may be handled and installed as a unit similarly to conventional "cartridge" seals. Although the seal is primarily intended for service with an oscillating shaft, it has utility as well on shafts which rotate continuously, even in these environments where it is desired to establish a pressure differential in addition to guarding against entry of foreign matter.

I claim as my invention:

1. In a shaft seal for sealing a shaft with respect to an opening, the combination comprirsing an annular rubber grommet and an annular rubber boot, said grommet and said boot being dimensioned to fit snugly on the shaft and in the opening radially opposed to one another, a flat sealing ring of annular shape having one edge mounted in the boot, a pair of annular diaphragm rings formed of thin resilient material on opposite sides of the sealing ring, said diaphragm rings having lip portions in face to face sealing engagement with the sealing ring, said diaphragm rings being of identical construction each having a circular inner edge, said grommet being formed with a shoulder at each end thereof for receiving the respective inner edges and so spaced that the diaphragm rings are squeezed inwardly into sealing engagement with the sealing ring.

2. In a seal for sealing a shaft with respect to an opening, the combiantion comprising an annular rubber grommet and an annular rubber boot, said grommet and said boot being dimensioned to fit snugly on the shaft and in the opening radially opposed to one another, a flat sealing ring of annular shape having one edge mounted in the boot, a pair of annular diaphragm rings formed of thin resilient material on opposite sides of the sealing ring, said diaphragm rings being of shallow dished shape presenting lip portions for riding against the sealing ring, said grommet having enlarged shoulder portions formed along its edges and presenting inwardly facing shoulders, said diaphragm rings having annular base portions thereon in fitted engagement with the shoulders, the shoulders being spaced to place the grommet in tension and thereby apply mutually inwardly forces against the diaphragm rings.

3. In a seal for sealing a shaft with respect to an opening, the combination comprising an annular rubber grommet, an annular rubber boot, said grommet and said boot being dimensioned to fit snugly on the shaft and in the opening radially opposed to one another, a flat sealing ring of annular shape having one edge mounted in a groove formed in the center of the boot, a pair of annular diaphragm rings formed of thin resilient material on opposite sides of the sealing ring, said diaphragm rings having lip portions in face-to-face sealing engagement with the sealing ring and having base portions anchored in the respective ends of the grommet, said boot having integral lip portions overlying the lip portions of the diaphragm rings and pressing resiliently against the rings for preventing entry of foreign material to the joints between the diaphragm rings and the sealing ring.

References Cited

UNITED STATES PATENTS

| | | | |
|---|---|---|---|
| 2,192,305 | 3/1940 | Gilman | 277—39 |
| 2,227,408 | 12/1940 | Hately | 277—89 X |
| 2,705,164 | 3/1955 | Dasse | 277—39 |

SAMUEL ROTHBERG, *Primary Examiner.*

U.S. Cl. X.R.

277—89